Oct. 24, 1933.  B. A. FRANCIS  1,932,267
TRACTOR LUG GUARD
Filed April 4, 1931
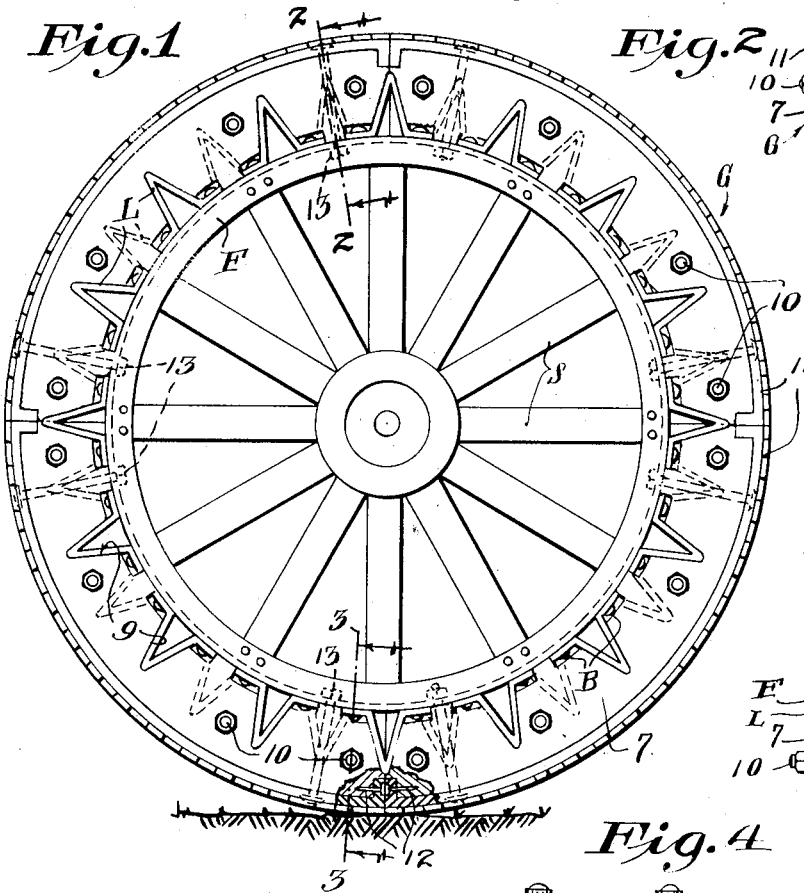
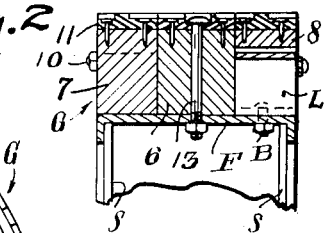
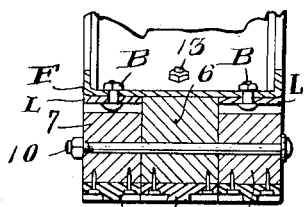
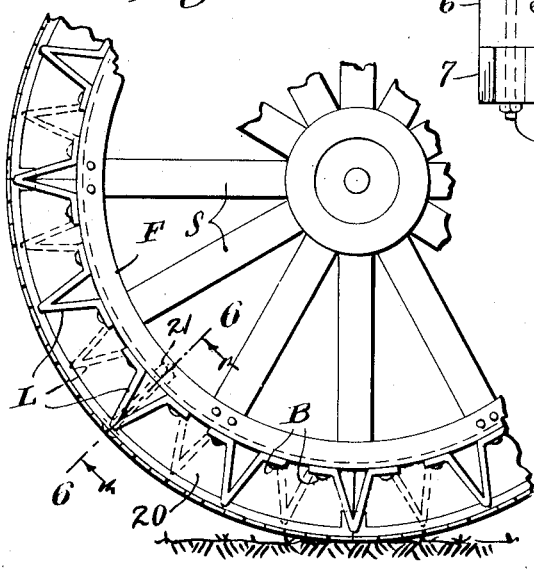
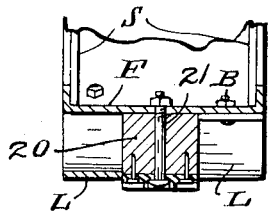
Inventor
Burton A. Francis
By his Attorneys
Williamson & Williamson Patented Oct. 24, 1933

1,932,267

UNITED STATES PATENT OFFICE 1,932,267

TRACTOR LUG GUARD

Berton A. Francis, near Clear Lake, Wis.

Application April 4, 1931. Serial No. 527,675

2 Claims. (Cl. 301—39)

This invention relates to tractor lug guards to prevent injuring roads and pavements when a tractor is moved on the highway.

In most states comparatively recent legislation has prohibited tractors with lugs from traveling on the state highways.

The present practice in moving a tractor, therefore, necessitates the detachment of the tractor lugs, requiring considerable labor and time or the application of lug guards, many varieties of which are relatively difficult to attach.

It is an object of my present invention to provide an extremely simple but highly efficient sectional device which may be quickly and easily attached to the tractor wheels to guard the lugs and prevent injury to pavements or roads and which constitutes a protective tread of larger diameter than the circumference of the lug extremities.

It is a further object to provide a device of the class described constructed in segments and adapted to be readily applied to or disconnected from a tractor wheel and held in place against displacement by cooperation and engagement with the tractor lugs.

These and other objects and advantages of the invention will be fully set forth in the following description and made in connection with the accompanying drawing, in which like reference characters refer to similar parts throughout the several views, and wherein:—

Fig. 1 is a side elevation of a tractor wheel equipped with one embodiment of my invention, a portion being broken away to show the abutment of two adjacent sections and the manner in which the tread may be secured thereto;

Fig. 2 is a cross section taken on the line 2—2 of Fig. 1;

Fig. 3 is a cross section taken on the line 3—3 of Fig. 1 showing the manner in which the laminations of the sections are secured together;

Fig. 4 is a fragmentary plan view of the inner edge of one of the sections;

Fig. 5 is a side elevation of a somewhat different form of the invention, and

Fig. 6 is a cross section taken on the line 6—6 of Fig. 5.

The form of the invention disclosed in Figs. 1 to 4 inclusive is designed for relatively heavy tractors and for use where tractors are to be utilized in pulling a heavy implement on the highway from one point to another.

A conventional type of tractor wheel is shown in the drawing having the usual felly F to which are secured the spokes S. Arranged circumferentially upon the outer periphery of the felly or rim are two series of lugs L which, as shown, comprise V-shaped treads projecting radially from the rim and having attachment portions connected to the rim or felly by suitable means such as the bolts B. The two series of lugs are disposed adjacent the edges of the wheel in spaced relation and are staggered in the conventional manner.

As shown in Figs. 1 to 4, I provide sectional guards indicated as entireties by the letter G, each comprising, in the forms illustrated, a quadrant. The sectional guards are preferably of laminated construction comprising an intermediate unrecessed lamination 6 and side laminations 7 and 8 having substantially V-shaped recesses 9 cut into the inner peripheries thereof and of complementary shape to the exterior of the lugs L. The recesses of the two laminations 7 and 8 are formed in staggered relation and adapted to snugly accommodate the respective tractor lugs, engagement between the lugs and recessed portions preventing circumferential slippage of the guard sections upon the wheel. The laminations 6, 7 and 8 are rigidly secured together by suitable means such as the transverse bolts 10, clearly shown in Figs. 1 and 3. Each of the sections G is preferably provided with an external tread 11 which may be constructed of tire casing material or some suitable composition which will have, preferably, wearing qualities and be, to some extent, compressible. The treads 11 may be affixed to the periphery of the guard sections G by nails or other suitable means and the ends of the tread members, as shown in Fig. 1, are preferably turned around the ends of the sections, fitting into the recessed portions and secured thereto by nails or other means 12.

The sections G are detachably secured upon the wheel in successive abutting relation by means of radially disposed heavy nutted bolts 13 and preferably only two of said bolts are provided for each section, said bolts as shown extending through the central unrecessed lamination 6 and through the felly or rim of the wheel.

In attaching my tractor lug guards, the sections may be successively applied and bolted to the felly or rim. In the case of tractors where the fenders or mud guards are spaced a considerable distance from the tractor wheels the sections may be applied successively to the wheel without jacking up the same. In several types of tractors, however, it is necessary to jack up the tractor wheels and apply the sections successively to the lower portions of the wheels.

It will be noticed that when attached the laminated guard sections will have great traction, will entirely cover and guard the lugs and will offer a broad traction area enabling the tractor to pull heavy vehicles or implements over the pavement and highway. The engagement of the staggered series of lugs and recessed portions of the guard sections prevents circumferential slippage of the guard device and the disposition of the central lamination 6 of each section between the spaced series of lugs prevents lateral displacement of the sections. No great amount of strain will be placed upon the attachment bolts 13 and consequently the nuts may be readily removed for the purpose of dismantling the device.

The form of my invention shown in Figs. 5 and 6 is especially adapted for light tractors or for heavy tractors where it is desired only to move the tractor over the highway and where it is unnecessary to obtain considerable traction for the purpose of pulling other heavy devices.

In this form I employ segmental sections 20, as shown being in the form of quadrants, which abut at their ends and are disposed circumferentially and centrally of the rim or felly of the wheel between the two series of tractor lugs. The thickness of the sections 20 is greater than the projection of the lugs L and consequently will engage the pavement or highway, supporting the weight of the tractor and preventing the lugs from damaging the highway. Sections 20 may each be formed integrally or if desired may be of laminated construction and when attached to the wheel are prevented from lateral displacement by abutment with the sides of the lugs L. Since the several sections 20 abut and are disposed between the spaced series of lugs, I find it only necessary to utilize a single nutted attachment bolt 21 for each of the sections.

From the foregoing description it will be seen that I have provided a simple but highly efficient construction for guarding the conventional lugs of tractors to enable the tractors to travel over pavements and smooth highways without injury to the road surface. Both forms of my device may be very quickly applied to or detached from the tractor wheels and the excessive labor of removing the lugs is entirely eliminated.

The cooperation between the several guard sections and the lugs is such that the sections will be prevented from circumferential or lateral displacement thereby rendering my device efficient for traction purposes in pulling a heavy implement or device over the highways behind a tractor.

It will, of course, be understood that various changes may be made in the form, details, proportions and arrangement of the parts, without departing from the scope of my invention, which, generally stated, consists in a device capable of carrying out the objects above set forth, and in the novel parts and combinations of parts disclosed and defined in the appended claims.

What is claimed is:—

1. In combination with a tractor wheel having two axially spaced series of spaced circumferentially arranged outwardly projecting traction lugs, a lug guard comprising a series of sectional guard members of somewhat greater thickness than the height of the tractor lugs, said sections constituting segments of an annulus and each having a series of lug-shaped recesses in the inner periphery thereof snugly receiving the projecting portions of a number of the tractor lugs, each section also having a portion thereof interposed snugly between said two axially spaced series of tractor lugs flush against the tractor wheel and means for detachably securing said sections to the tractor wheel.

2. In combination with a wheel having two axially spaced series of spaced circumferentially arranged outwardly projecting traction lugs, a lug guard comprising a series of solid arcuate sectional guard members of somewhat greater thickness than the height of said lugs, said sections each comprising three segments of substantially rectangular cross section rigidly secured together side by side, the outer segments of each section each having a series of lug-shaped recesses extending into the inner periphery thereof for snugly receiving a number of the tractor lugs, the central segment of each section being unrecessed and snugly fitting between the two axially spaced series of lugs and secured flush against the rim of the wheel and abutting certain ends of the lugs to prevent lateral displacement of the section and an integral tread member covering the outer periphery of each of said several sections.

BERTON A. FRANCIS.